United States Patent

[11] 3,608,683

| [72] | Inventor | Kentaro Fujisawa<br>Sakai, Japan |
|------|----------|----------------------------------|
| [21] | Appl. No. | 852,239 |
| [22] | Filed | Aug. 22, 1969 |
| [45] | Patented | Sept. 21, 1971 |
| [73] | Assignee | Shimano Kogyo Kabushiki Kaisha<br>Osaka, Japan |
| [32] | Priority | Sept. 18, 1968 |
| [33] | | Japan |
| [31] | | 43/67783 |

[54] BICYCLE HUB HAVING A BUILT-IN THREE-STAGE SPEED CHANGE MECHANISM AND EQUIPPED WITH A COASTER BRAKE
5 Claims, 10 Drawing Figs.

| [52] | U.S. Cl. | 192/6 A, 192/43.1 |
|------|----------|-------------------|
| [51] | Int. Cl. | F16h 57/10 |
| [50] | Field of Search | 192/6 A |

[56] References Cited
UNITED STATES PATENTS

| 1,277,070 | 8/1918 | Harrison | 192/6 A X |
| 3,257,868 | 6/1966 | Preece | 192/6 A X |
| 3,366,206 | 1/1968 | Shimano | 192/6 A |
| 3,432,013 | 3/1969 | Matsumoto | 192/6 A |

*Primary Examiner*—Benjamin W. Wyche
*Attorney*—Wenderoth, Lind and Ponack

ABSTRACT: This invention relates to a bicycle hub having a built-in three-stage speed change mechanism, wherein rotation of a driving drum is imparted through separate pawl and ratchet means to an annulus or driven member and to a planet carrier supporting a plurality of planet pinions, and the pawl and ratchet means between said driving drum and said annulus is adapted to impart both forward and backward rotations of the driving drum to the annulus, the mechanism being so improved that the invention exhibits practical effects such as a simple construction, a less trouble and so on.

KENTARO FUJISAWA, INVENTOR

BY Wenderoth Lind & Ponack

ATTORNEYS

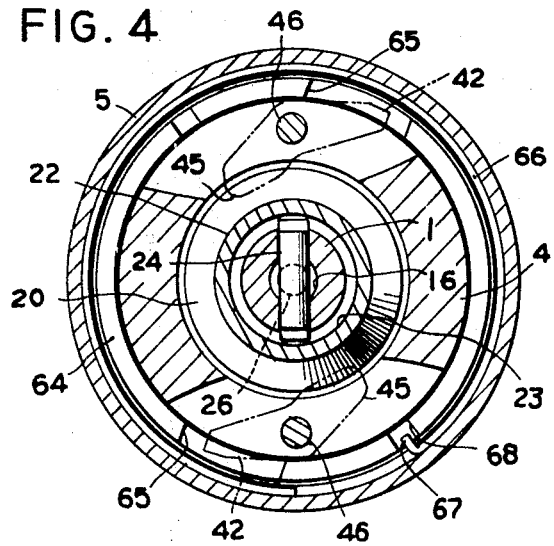
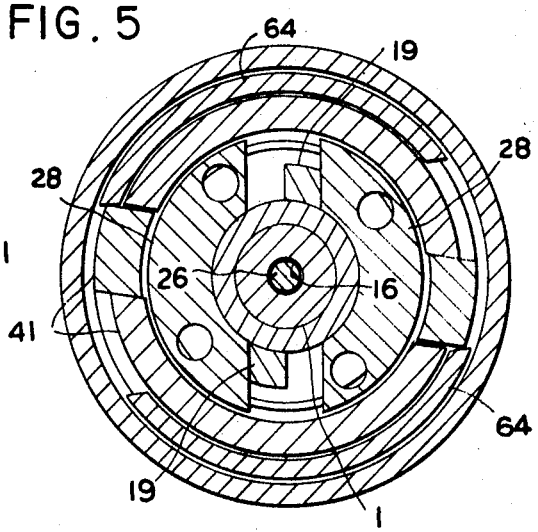
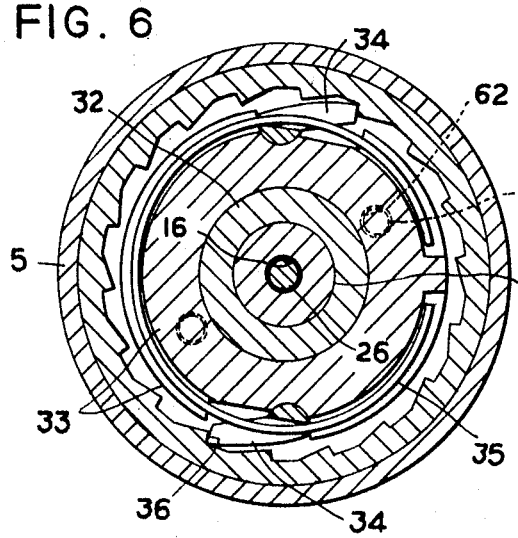
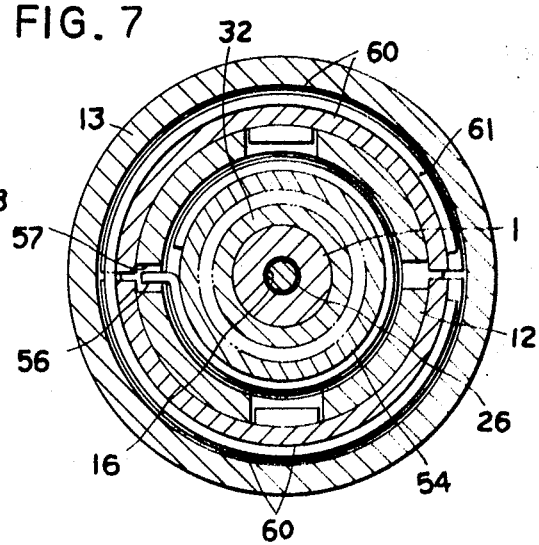
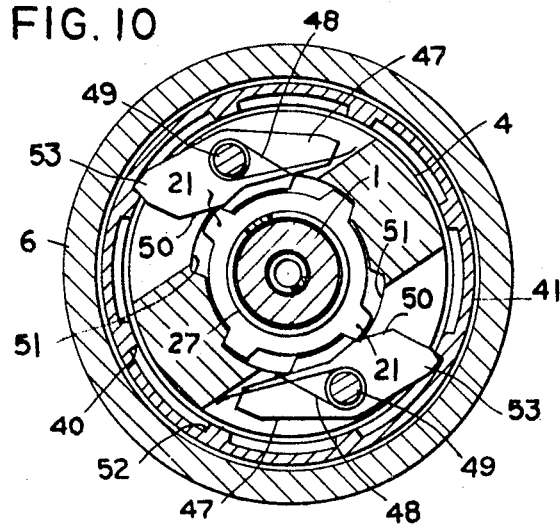
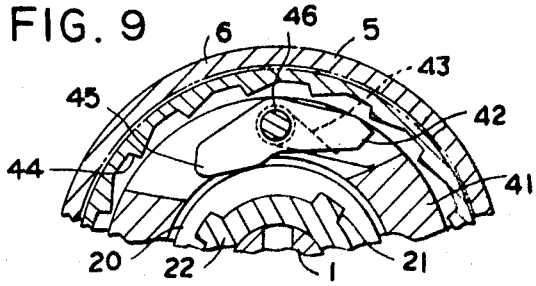
KENTARO FUJISAWA, INVENTOR 3,608,683

BICYCLE HUB HAVING A BUILT-IN THREE-STAGE SPEED CHANGE MECHANISM AND EQUIPPED WITH A COASTER BRAKE

In a bicycle hub having a built-in speed change mechanism comprising a planetary gear and including a coaster brake, the prior art transmission systems which have clutches for both transmitting from the driving drum fixed to a chain gear or sprocket wheel to the planet carrier and also to the internal or orbit gear are shifted through their respective clutches, whereupon it frequently happens that said two clutches in said transmission systems are simultaneously put into engagement, thereby causing inoperativeness by preventing the desired changeover of the transmission, and also sometimes resulting in lost-motion treading of the chain pedals and/or damage to the related parts. Said lost-motion treading or travel of the pedals is especially dangerous when applying the coaster brake. For the purpose of avoiding these faults, many proper measures have been devised. However, the prior art bicycle hubs of the type above-mentioned were complicated in construction and liable to be damaged.

The principal object of the invention is to provide an improved bicycle hub having a built-in three-stage speed change mechanism of planetary gear-type, which is reliable in operation and comparatively simple in construction.

Other objects of the present invention will become apparent from the following detailed description taken in conjunction with the accompanying drawings wherein:

FIGS. 2 to 7 show cross sections taken along lines II—II, III—III, IV—IV, V—V, VI—VI, and Vii—VII respectively of FIG. 1;

FIG. 9 is a partial cross section of the mechanism shown in FIG. 1, showing the related essential parts in the position for low-speed transmission; and FIG. 10 is a cross section similar to FIG. 2, but the related parts in the position for applying the brake.

Figure 1:
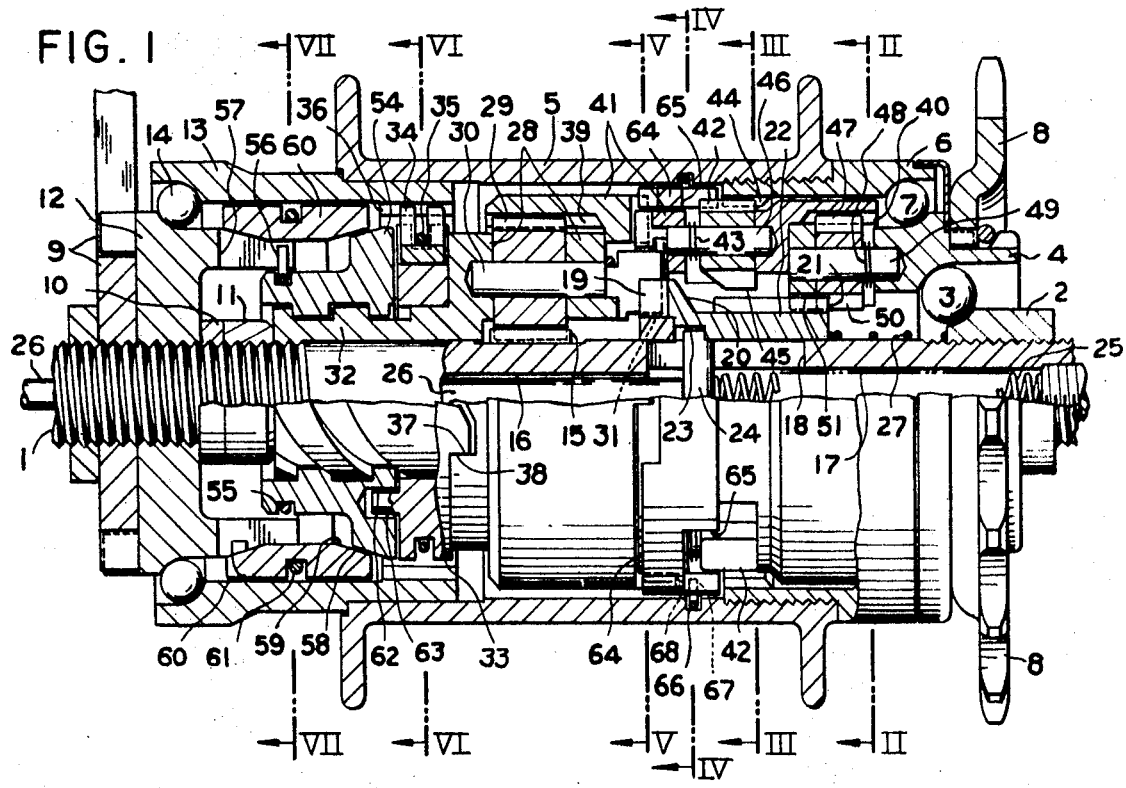
FIG. 1 is a rear view in longitudinal section of a built-in three-stage speed change mechanism for a coaster hub of a bicycle forming an embodiment of the present invention, parts being shown in the position for high-speed transmission.

Referring now to the drawings and particularly to FIG. 1, the reference numeral 1 designates a rear dead axle of a bicycle, which has at its right hand end a screw-threaded hub cone or ball bearing inner race 2 supporting a driving sleeve or drum 4 through bearing balls 3. A right-hand extension 6 of a hub shell 5 is supported by a radially outwardly projecting flange portion of the driving drum 4 forming an inner race of a ball bearing comprising bearing balls 7. Securely mounted adjacent to said flanged portion of the driving drum 4, there is a sprocket wheel 8, which can rotate said driving drum 4 integrally therewith. At the left hand end, the axle 1 has a cup-shaped end cover 12, which supports a left-hand extension 13 of the hub shell 5 by means of a similar ball bearing comprising bearing balls 14. The end cover 12 is secured in place by means of clamping rings 10, 11 threadedly engaging the axle 1 and by means of a fitting arm or plate 9, which plate may be fixedly mounted on the rear frame (not shown) of the bicycle in any convenient manner.

Figure 2:
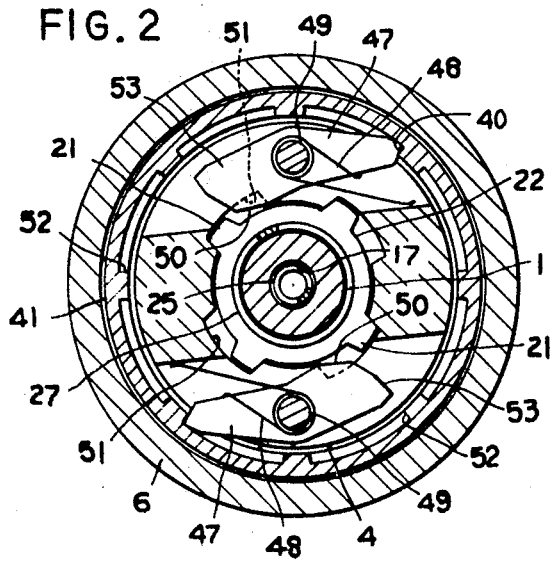
Figure 3:
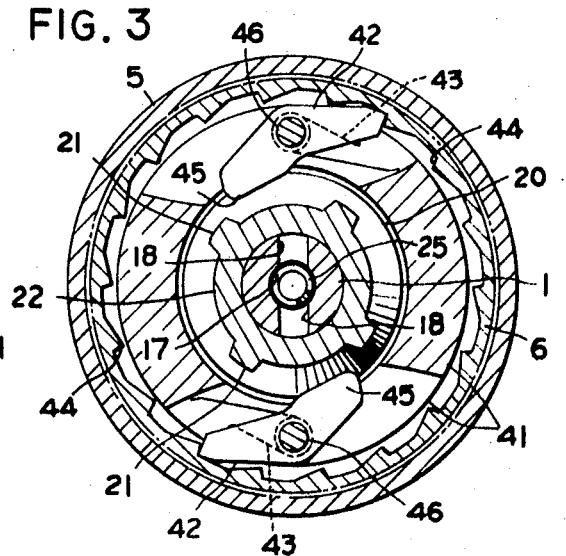
Figure 8:
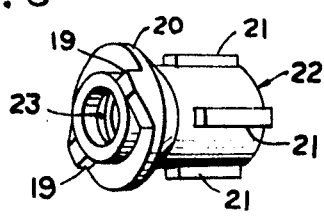
FIG. 8 is a perspective view showing a changeover bushing.

The rear dead axle 1 has a sun gear 15 securely mounted at approximately midportion thereof, and is formed with a concentric guide bore 16 as well as a concentric spring receiving bore 17 communicating with said guide bore. In a portion of the rear dead axle 1 which extends rightwardly from the left-hand end of the spring receiving bore 17, there are diametrically arranged guide slots 18 (FIGS. 1 and 3). A changeover bushing or ring 22 is slidably mounted on the axle 1. As best shown in FIGS. 1 and 8, this bushing is provided at the left-hand end portion with an annular flange, having two driving pawls 19 for high gear disposed in diametrically symmetrical positions and further provided at the right-hand end portion on the outer periphery with an outer inclined guide face 20, and further provided at the right-hand end portion on the outer periphery with a plurality of splines 21 (FIGS. 1, 2, 3, 8 and 10). Formed in the inner periphery of the bushing 22 is an internally cut groove 23, which is constantly in engagement with opposite ends of a control pin 24 (FIGS. 1 and 4) inserted into said slots 18. The pin 24 has a tendency to be constantly forced in the leftward direction by the action of a spring means 25 disposed within said bore 17, and abuts at its left-hand side against the inner end of a push rod 26 disposed within the guide bore 16. Between the changeover bushing 22 and the bearing race 2, there is a compression spring 27 which slidably encircles axle 1 and prevent unneccessary rotation of the bushing 22. It will be seen that said bushing 22 and the control pin 24 are normally biassed inwardly by the springs 25 and 27, and that by remotely actuating the push rod 26 from a suitable exterior control lever of conventional from (not shown) the changeover bushing 22 can be axially moved inwardly or outwardly along the axle 1.

Within the hub shell 5, there is provided a planet carrier 28 supporting a plurality of planet pinions 29, each mounted on a pin 30 and meshing with said sun gear 15. The rightwardly extending portion of the planet carrier 28 is formed as a ratchet 31 engageable with the driving pawls 19 for high gear, whilst the leftwardly extending cylindrical portion of the same is formed as a sleeve 32 of smaller diameter and rotatably or loosely mounted on the axle 1, the sleeve being provided with a male screw thread. Said driving pawls 19 form a jaw clutch means for high gear in cooperation with the ratchet 31. Loosely mounted on the root portion of said screw-threaded sleeve 32 is an intermediate ring 33, on which two driving pawls 34 for low gear are pivotally mounted in diametrically symmetric relation, each normally biassed by a common spring 35 (FIGS. 1 and 6) to bring the tip thereof into engagement with a ratchet 36 internally formed on said left-hand extension 13 of the hub shell 5. Said driving pawls 34 form a pawl and ratchet means for low gear in cooperation with the ratchet 36. The ring 33 is further provided with dogs 38 engageable with corresponding notches 37 in the planet carrier 28, whereby the ring 33 is permitted to rotate integral with the planet carrier 28 upon normal (forward) rotation of the planet carrier 28.

As in FIG. 1, the rightwardly extending portion of the planet carrier 28 as well as the leftwardly (inwardly) extending portion of the drum 4 are adapted together to be surrounded by an annulus 41, which consists of a pair of ring or sleeve members in splined connection with each other for integral rotation. The left ring is formed as an internal or orbit gear 39 meshing with said planet pinions 29 whilst the right ring is formed in the inner periphery with a plurality of notches 40 (FIGS. 1 and 2). On the substantially midportion of said annulus 41, there are two driving pawls 42 for high and normal or direct gears disposed in diametrically symmetrical positions as best shown in FIG. 3, each having a tail 45, and pivotally mounted on a pin 46 and normally biassed by a spring 43 to bring the tip thereof into driving engagement with a ratchet 44 formed in said right-hand extension 6 of the hub shell. Said driving pawls 42 similarly form a pawl and ratchet means for high and normal gears in cooperation with the ratchet 44.

At the leftward extension of the driving drum 4, there are two driving pawls 47 for normal and low gears disposed in diametrically symmetrical positions, each pivotally mounted on a pin 49, and normally biassed by a spring 48 to bring its tip in to driving engagement with said notches 40 of the annulus 41 while bringing a thickest part or belly 50 thereof into a position as shown in FIG. 2. The driving drum 4 is further provided on the inner periphery of its left-hand extension with a plurality of circumferentially spaced grooves 51 (FIGS. 1, 2 and 10), within which the corresponding splines 21 of the changeover bushing 22 are respectively inserted in a manner allowing said driving drum 4 to be rotated relative to said bushing 22 for a small limited angle of rotation, thereby enabling each spline 21 upon reverse motion of the driving drum 4 to press the associated contact belly 50 of the driving pawl 47, thus disengaging its tip from the associated notch 40 in the annulus 41.

As best shown in FIGS. 2 and 10, the annulus 41 is formed with notches 52 (similar to the notches 40) whilst the driving drum 4 is provided with reverse driving pawls 53, each integral with said driving pawl 47 because the later is formed its tail or heel as a reverse driving pawls. Each reverse driving pawl 53 is adapted to be brought into brake engagement with said notch 52 upon reverse motion of the driving drum 4, and the pawl is also adapted to be tripped out of engagement with said notch 52 during forward rotation of the driving drum 4 at least in high-speed drive.

As will be seen from the foregoing, in high-speed transmission condition as shown in FIGS. 1 to 7 wherein the changeover bushing 22 is held in its leftmost position without any assistance of the push rod 26, the driving pawls 19, 34, 42 and 47 are all put into engagement. In this case, the forward motion of the sprocket wheel 8 is transmitted through the driving drum 4, the grooves 51, the splines 21, the changeover bushing 22, the driving pawls 19 for high gear, the ratchet 31, the planet carrier 28, the planet pinions 29, the annulus 41, the driving pawls 42 and the ratchet 44 and thence to the right hand extension 6. It will be readily understood that the driving pawls 34 and 47 are not in operative engagement with the ratchet teeth 36 and the notches 40 respectively, because the left-hand extension 13 of the hub shell 5 and the annulus 41 are driven at increased speed overcoming the rotational speeds of the planet carrier 28 and driving drum 4 respectively.

In order to shift from such high gear to normal or middle gear, it is merely necessary to actuate the push rod 26 to be moved axially rightwardly for a predetermined distance along the axle 1. This axial movement causes the changeover ring or bushing 22 to be similarly moved, whereby only the driving pawls 19 for high gear are brought out of engagement with the ratchet 31 formed in the planet carrier 28. Consequently, forward rotation of the sprocket wheel 8 is transmitted to the hub shell 5 through the driving drum 4, the driving pawls 47 for normal and low gears, the notches 40, the annulus 41, the driving pawls 42 for high and normal gears, the ratchet 44 and the right hand extension 6 of the hub shell 5. Thus, it will be noted that the normal speed transmission to the hub shell 5 is effected by directly transmitting the rotation of the annulus 41. When driving in normal or middle gear, the driving pawls 34 slip over the ratchet teeth 36 and therefore are inoperative due to the higher rotational speed of the hub shell 5 relative to said pawls 34.

Shifting of a power transmission from normal gear to low gear is accomplished by further actuating the push rod 26 against the action of the springs 25 and 27 so that the changeover bushing 22 is moved to a right extreme position, in which the driving pawls 19 for high gear are brought out of engagement with the ratchet 31 formed in the planet carrier 28 as well as the tails 45 of the driving pawls 42 for high and normal gears are each cammed out by the guide face 20 (in FIG. 9), thereby biassing the respective tips of said pawls to be disengaged from the ratchet 44. In the case of the low gear, rotation of the sprocket wheel 8 is therefore transmitted with reduction to the hub shell 5 through the driving drum 4, the driving pawls 47 for normal and low gears, the notches 40, the annulus 41, the orbit gear 39, the planet pinions 29, the planet carrier 28, the notches 37, the dogs 38, the intermediate ring 33, the driving pawls 34 for low gear, the ratchet teeth 36 and the left hand extension 13 of the hub shell.

With respect to the three-stage change speed mechanism as mentioned above, it is necessary to devise the mechanism so that brake can be applied any time during any speed transmission condition. For this purpose, an annular brake frame 54 is complementally thread mounted on the threaded sleeve 32, which is extended leftwardly from the planet carrier 28. At the left-hand end portion of said brake frame 54, there is wound a resilient ring 55 having a radially outwardly directed projection or hook 56 at its one end, which projection is adapted to engage a recess or groove 57 formed in the skirt of the end cover 12, thereby causing the brake frame 54 to be prevented from backward rotation. Said brake frame 54 is adapted to be moved rightwardly upon normal forward rotation of the driving drum 4 and leftwardly upon reverse rotation of the threaded sleeve 32 which caused by the reverse rotation of the driving drum 4. The brake frame 54 is provided with a tapered face 58 which is adapted to cooperate with a tapered friction face 59 provided on a brake ring 60. The brake ring may consist of a plurality of arcuated segments (in FIG. 7). The brake ring 60 is subjected to external pressure by a split ring spring 61 wound therearound.

Upon reverse motion of the sprocket wheel 8 necessary for the application of the brake, in all gears, the driving drum 4 will rotate in a similar manner and the bellies 50 of the driving pawls 47 mounted to the drum 4 rotate in the clockwise direction about the respective pins 49, urged by the associated splines 21 on the changeover bushing 22, whereupon as shown in FIG. 10 the tips of the driving pawls 47 are disengaged from the notches 40 respectively while at the same time the reverse driving pawls 53 are brought into operative engagement with the notches 52 in the annulus 41. In the case of such a reverse driving condition, the drive is through the driving drum 4, the reverse driving pawls 53, the notches 52, the annulus 41, the orbit gear 39 and the planet pinions 29 to the planet carrier 28 and thence to the brake frame 54. Thus, the brake frame 54 is moved axially leftwardly along the axle 1 because of the reverse rotation of the threaded sleeve 32 of the planet carrier 28, thereby permitting the tapered face 58 to cooperatively abut against the face 59 of the brake ring 60 and force the arcuated segments forming the brake ring 60 to be expanded radially outwardly against the force of said external pressure due to the split ring spring 61. This causes said brake ring 60 to move into friction engagement with the inner periphery of the left-hand hub shell extension 13 and exhibit a required brake effect upon the hub shell 5.

Further, said brake frame 54 is provided in the right-hand end with holes 62 for receiving axially leftwardly directed projections 63 (FIG. 1) mounted on the intermediate ring 33, thereby to allow the brake frame 54 and intermediate ring 33 to be rotated as a whole. When the intermediate ring 33 is in a position, in which its dogs 38 are in engagement with the notches 37 in the planet carrier 28 under the condition that said ring 33 is capable of moving for a slight distance axially inwardly and outwardly relative to the planet carrier 28, the brake frame 54 is adapted to be spaced away from the intermediate ring 33 so as to provide a slight clearance therebetween. Because of the presence of such clearance, the brake frame 54 is prevented from being screwed excessively tight to the planet carrier 28 during any speed transmission and thus can be readily moved axially leftwardly along the axle 1 upon braking action.

In addition, in case it should happen that the tips of the driving pawls 34 stop in contact with the respective stepped edges of the ratchet teeth 36 when the bicycle is stopped by the application of the brake for example, it will become preferable to release the brake for restarting the bicycle by applying rotation in the normal direction. In case it should happen that the tips of the driving pawls 42 for high and normal gears stop in contact with the respective stepped edges of the ratchet teeth 44, it will become difficult to transmit a normal rotation for restarting the bicycle by releasing the brake through such a pawl and ratchet means. For the purpose of preventing the above disadvantage, there is provided a control ring or sleeve 64 (FIGS. 1, 4 and 5), which is arranged around the right ring member forming the annulus 41. Said control ring 64 is adapted to be turnable with respect to the annulus 41 within the limit of the small angle of play and be rotated integral with the same beyond said limit. The control ring 64 is provided with opposed arcuated slots 65 (FIGS. 1 and 4) from which the tips of the driving pawls 42 can protrude only in the case of the normal rotation of the annulus 41.

As shown in FIGS. 1 and 4, a resilient member or spring ring 66 having a hook 67 at its one end is disposed within an internally cut groove in the inner periphery of the hub shell 5, with said hook 67 inserted into a hole 68 provided in said control ring 64, thereby suppressing the rotation of the control ring 64 in the reverse direction and allowing retraction of the driving pawls 42 from the slot 65 in the control ring 64 upon reverse rotation of the annulus 41 such as would resulting from the application of the brake, the arrangement being such that the tips of the driving pawls 42 can be disengaged from the ratchet 44 upon reverse rotation of the annulus 41 and the brake can be readily released before starting next drive.

From the foregoing it will be seen that according to the present invention a pawl and ratchet means per se is employed in the transmission and change-speed mechanism, so that any potential trouble which might be caused by simultaneous engagement of two transmission systems to be changed over would be avoided, and that it will also be possible to effectively avoid any trouble and lost-motion treading of the pedal caused by belated changeover operation. Especially as a result of the provision of the arrangement, wherein, between the driving drum and the annulus, a pawl and ratchet means operable responsive to the reverse rotation of the driving drum is provided so that said reverse rotation necessary for applying the brake is imparted through said annulus to the planet carrier, structurally essential parts for bringing the remaining pawl and ratchet means in the transmission system out of operative engagement during braking are reasonably decreased in number, resulting in exhibiting practical effects such as a simple construction.

I claim:

1. A bicycle hub having a built-in three-stage speed change mechanism and equipped with a coaster brake, comprising:
   a. a hub shell having a right-hand extension,
   b. a rear dead axle,
   c. a driving sleeve or drum having an inner extension and rotatably mounted on said dead axle near the right-hand extension of said hub shell,
   d. a rotatable sprocket wheel securely mounted on said driving drum,
   e. a planetary gear mechanism including a planet carrier, an orbit gear, and a sun gear on said dead axle,
   f. changeover means including a ring bushing slidably and rotatably mounted on said dead axle,
   g. jaw clutch for high gear operatively connecting the driving drum and the planet carrier, being adapted to be tripped by the ring bushing upon axial movement thereof to a predetermined position,
   h. a pawl and ratchet means for normal and low gears drivingly connecting the driving drum and the orbit gear during driving, being adapted to be tripped upon a reverse motion of the driving drum,
   i. a pawl and ratchet means operatively connecting the driving drum and the orbit gear during braking thereby to effect brake engagement, said means being adapted to be tripped upon a forward motion of the driving drum,
   j. a pawl and ratchet means for high and normal gears operatively connecting the orbit gear and the hub shell, being adapted to be tripped by the ring bushing upon axial movement thereof to a predetermined position,
   k. a pawl and ratchet means for low gear operatively connecting the planet carrier and the the hub shell, and
   l. said coaster brake including a brake frame mounted on the planet carrier and adapted to be moved axially responsive to actuation upon reverse rotation of the planet carrier.

2. The bicycle hub of claim 1, comprising control ring means surrounding the orbit gear and actuatable for simultaneously retracting the driving pawls of said pawl and ratchet means for high and normal gears.

3. The bicycle hub of claim 1, wherein the pawls of said pawl and ratchet means for low gear are mounted on an intermediate ring encircling a threaded sleeve of said planet carrier in a manner as to be rotated integral with the planet carrier upon a forward motion thereof.

4. The bicycle hub of claim 1, wherein the heel of each pawl of said pawl and ratchet means for normal and low gears is formed as a pawl for said reverse braking pawl and ratchet means, and the ratchets of both means are formed in one piece, thereby effecting a simplification of the mechanism.

5. The bicycle hub of claim 3, wherein the intermediate ring is provided with projections axially extending toward the brake frame and engageable for normal rotation with respective holes formed in the brake frame, said intermediate ring and said brake frame being adapted to have a slight clearance therebetween during driving in any speed transmission condition, thereby to prevent an excessively tight engagement of the brake frame with the intermediate ring during driving and enable the brake frame to be readily moved axially responsive to actuation upon reverse rotation of the planet carrier.